(12) United States Patent
Ito et al.

(10) Patent No.: US 6,418,103 B1
(45) Date of Patent: Jul. 9, 2002

(54) INITIALIZING A PHASE-CHANGING OPTICAL RECORDING MEDIUM USING A LASER INCLUDING A HIGH SPEED SHUTTER

(75) Inventors: Kazumine Ito, Tokyo; Manami Nakamura, Kanagawa; Osamu Kawakubo, Saitama; Hiroshi Kawase, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/392,905

(22) Filed: Sep. 9, 1999

(30) Foreign Application Priority Data

Sep. 14, 1998 (JP) ............................. 10-260249

(51) Int. Cl.[7] ................................ G11B 7/00
(52) U.S. Cl. .................... 369/47.55; 369/47.5; 369/121
(58) Field of Search ................ 369/120, 122, 369/121, 116, 47.5, 47.55

(56) References Cited

U.S. PATENT DOCUMENTS 4,847,850 A * 7/1989 Kafka et al. ................ 372/6
5,528,611 A * 6/1996 Scheps ........................ 372/14
5,684,778 A * 11/1997 Yamada et al. ............. 369/100

FOREIGN PATENT DOCUMENTS

JP 62-20153 * 1/1997 ................ 369/100

* cited by examiner

Primary Examiner—Nahil Hindi
(74) Attorney, Agent, or Firm—Oblon, Spivak, McClelland, Maier & Neustadt, P.C.

(57) ABSTRACT

Disclosed are an apparatus for initializing an optical recording medium to be initialized with stability and ease without employing any focus servo means, and a phase-changing optical recording medium initialized by the initializing apparatus to have a recording layer in a uniform crystalline state over an entire area of the medium which takes part in recording and reproduction of an information signal. In the apparatus for initializing a phase-changing optical recording medium, a laser beam emitted from a laser beam source is irradiated to a recording layer, in an amorphous state, formed in an optical recording medium to be initialized, which is a pre-stage member of the phase-changing optical recording medium, for changing the recording layer into a crystalline state. The laser beam source, e.g., a YAG laser, includes a high-speed shutter for exciting the laser beam source while the laser beam source is held in a state of not starting oscillation, and emits the laser beam within a very short time on the order of several tens nanoseconds (ns) to several hundreds nanoseconds (ns) with its peak power increased more than 10000 times that produced in a continuous oscillation mode.

12 Claims, 13 Drawing Sheets

LEASER BEAM

FIG. 8

LEASER BEAM

INITIALIZING A PHASE-CHANGING OPTICAL RECORDING MEDIUM USING A LASER INCLUDING A HIGH SPEED SHUTTER

BACKGROUND OF THE INVENTION

1. Field of the Invention

The present invention relates to an apparatus for initializing a phase-changing optical recording medium, and a phase-changing optical recording medium. More specifically, the present invention relates to an apparatus for initializing a phase-changing optical recording medium wherein a laser beam is irradiated to a recording layer, in an amorphous state, of an optical recording medium to be initialized, which is a pre-stage member of the phase-changing optical recording medium, for changing the amorphous state of the recording layer into a crystalline state with heat of the laser beam, and also relates to a phase-changing optical recording medium.

2. Description of the Related Art

One example of erasable and rewritable optical recording mediums is a phase-changing optical recording medium. A general schematic construction of the phase-changing optical recording medium will be described with reference to FIGS. 7 and 8 which are schematic sectional views of different types of phase-changing optical recording mediums.

Figure 7:
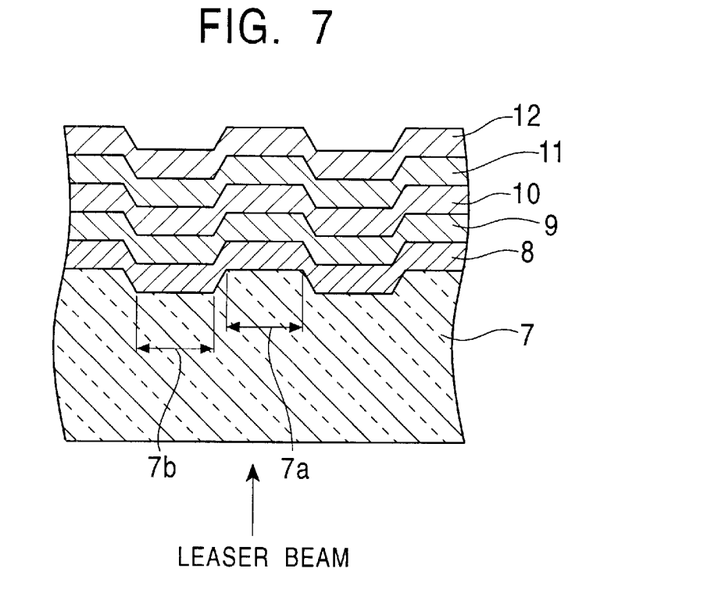
FIG. 7 is a schematic sectional view of one type of conventional phase-changing optical recording medium.
Figure 8:
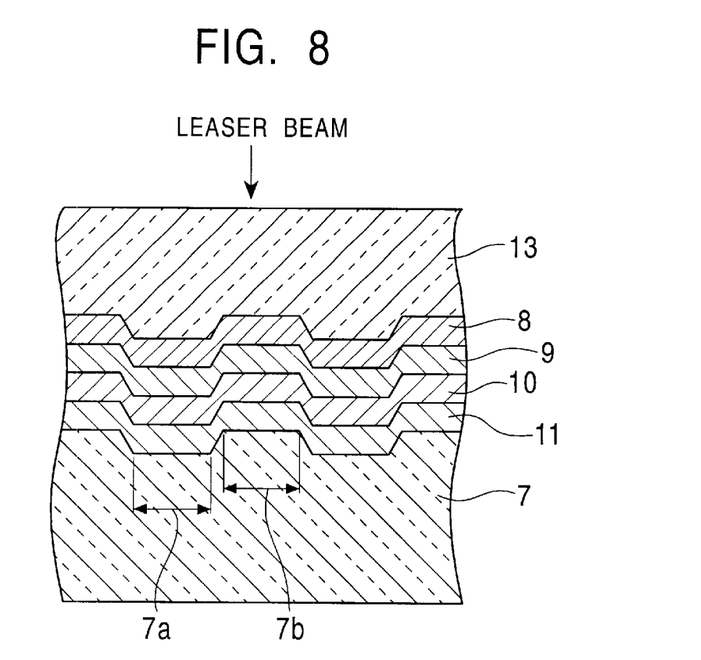
FIG. 8 is a schematic sectional view of another type of conventional phase-changing optical recording medium.

As shown in FIG. 7, in a phase-changing optical recording medium of the type that a laser beam emitted from a semiconductor laser enters the medium from the side of a transparent base plate 7, a land 7a and a groove 7b are formed on the principal surface of the transparent base plate 7 in advance. On the transparent base plate 7, a first dielectric layer 8, a recording layer 9 made of a phase-changing material, a second dielectric layer 10, a reflecting layer 11, and a protective film 12 are formed successively in the order named. Also, as shown in FIG. 8, in a phase-changing optical recording medium of the type that a laser beam emitted from a semiconductor laser enters the medium from the side of a transparent cover layer 13, a land 7a and a groove 7b are formed on the principal surface of a transparent base plate 7 in advance. On the transparent base plate 7, a reflecting layer 11, a second dielectric layer 10, a recording layer 9 made of a phase-changing material, a first dielectric layer 8, and the transparent cover layer 13 formed of a resin or film, for example, are formed successively in the order named. The thickness of the transparent base plate 7 or the transparent cover layer 13 is dependent on the NA (Numerical Aperture) of a condensing lens. Correlation between them is such that the thickness decreases as the NA of the condensing lens increases.

In the above structure, the recording layer 9, the first and second dielectric layers 8, 10, and the reflecting layer 11 are generally formed by film forming steps using, e.g., sputtering or vapor deposition. The recording layer 9 is in an amorphous state after the film forming steps, and is then initialized from the amorphous state into a crystalline state. When information is recorded on the phase-changing optical recording medium, a recording mark portion is changed into the amorphous state with the intensity of the laser beam irradiated, while a non-recording portion remains in the crystalline state. In other words, before the user employs a phase-changing optical recording medium, an area of the medium which takes part in recording and reproduction of an information signal is entirely held in the crystalline state.

Figure 9:
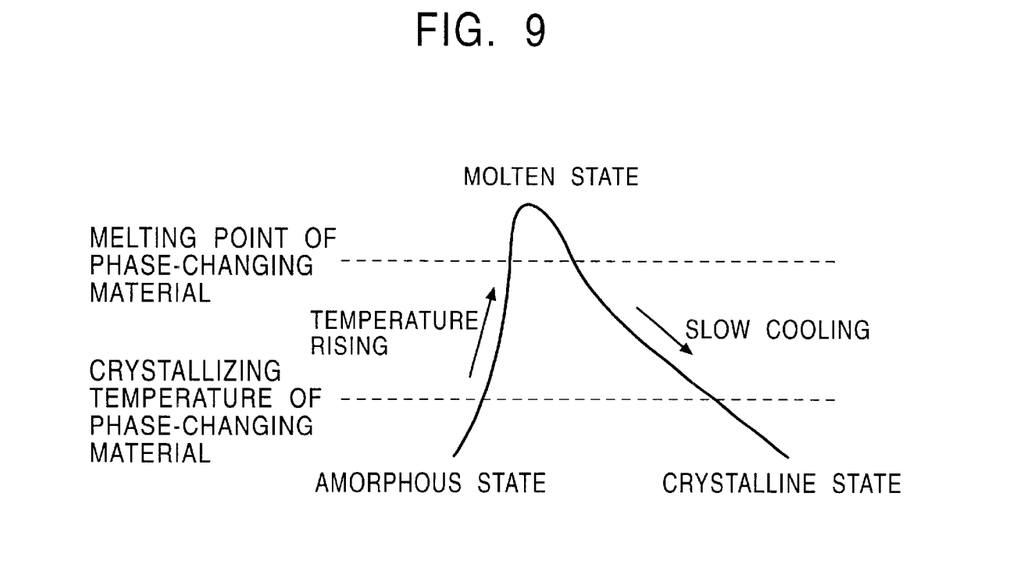
FIG. 9 is a schematic view for explaining one conventional process of initializing an optical recording medium to be initialized.
Figure 10:
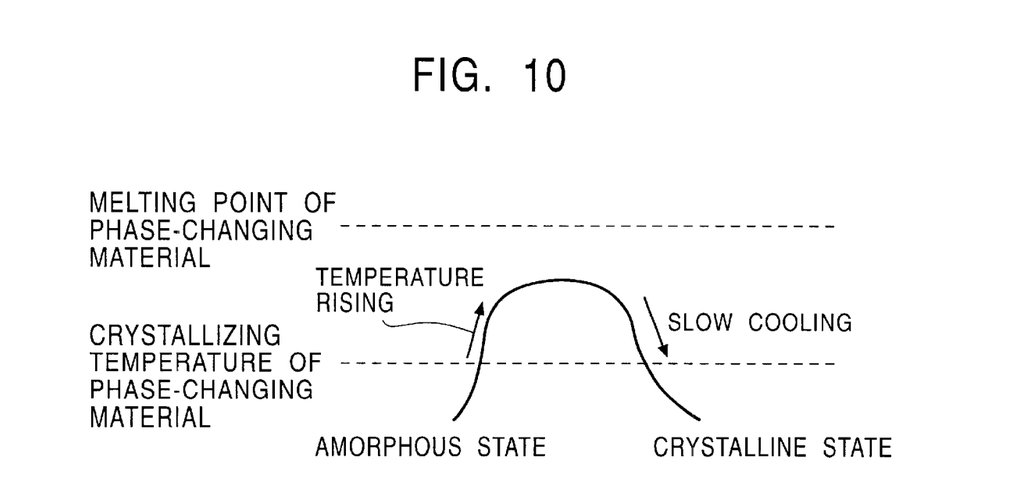
FIG. 10 is a schematic view for explaining another conventional process of initializing an optical recording medium to be initialized.

In the above initializing step, there are two typical methods shown in FIGS. 9 and 10, which conceptually illustrate the initializing process, for changing the recording layer 9 from the amorphous state into the crystalline state. An initializing apparatus is employed to carry out any of the two typical methods. The method shown in FIG. 9 is called a fusion crystallizing process. With this process, the crystalline state is produced by raising the temperature of the recording layer 9 to a level higher than the melting point of the phase-changing material for change from the amorphous state into a molten state, and then slowly cooling it. The method shown in FIG. 10 is called a solid-phase crystallizing process. With this process, the crystalline state is produced by raising the temperature of the recording layer 9 in the amorphous state to a level higher than the crystallizing temperature of the phase-changing material, holding the raised temperature during a period necessary for crystal growth, and then slowly cooling it. In other words, regardless of which one of the methods is employed, the initializing apparatus requires a means for raising the temperature of the recording layer 9 in the amorphous state, for example, a heat source such as a laser beam source. When a laser beam source is employed, the focus of a laser beam is formed by a condensing lens on the recording layer 9 made of the phase-changing material so that the focused area is subject to a large energy density.

Figure 11:
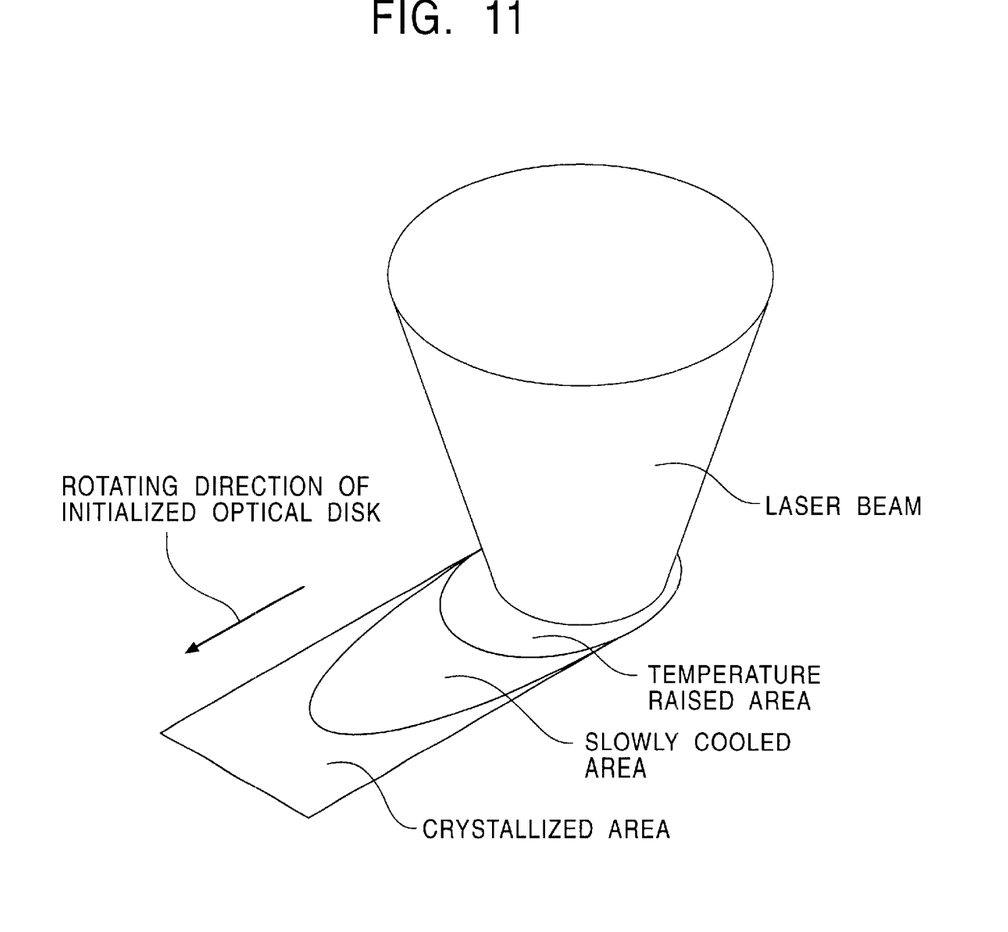
FIG. 11 is a schematic view for explaining a conventional process in which a recording layer is changed from an amorphous state into a crystalline state.

FIG. 11 is a schematic view for explaining a process in which the recording layer 9 is changed from the amorphous state into the crystalline state by irradiating a laser beam, which is emitted from a laser beam source and focused through a condensing lens, to the recording layer 9, in the amorphous state, of an optical recording medium to be initialized which is a pre-stage member of the phase-changing optical recording medium.

As shown in FIG. 11, a spot of the laser beam emitted from the laser beam source and focused through the condensing lens is formed on the recording layer 9, in the amorphous state, of the optical recording medium to be initialized which rotates at a predetermined rotational speed. The temperature of an area, in which the beam spot is formed, is raised beyond the crystallizing temperature of the phase-changing material, and is then moved away from the beam spot with the rotation of the initialized optical recording medium for crystallization under slow cooling. Through such a process, the phase-changing optical recording medium is completed in which an area of the medium taking part in recording and reproduction of an information signal is entirely held in the crystalline state.

For bringing the entire area of the medium taking part in recording and reproduction of an information signal into the crystalline state, the energy density of the laser beam, which is emitted from the laser beam source toward the recording layer 9 made of the phase-changing material, must be held constant. Usually, the optical recording medium to be initialized involves an inherent slight warp attributable to flatness of the transparent base plate 7. Therefore, when the optical recording medium to be initialized is, e.g., a disk-shaped medium, there occurs a plane runout on the order of ±500 µm during the rotation. Assuming that the numerical aperture of the condensing lens is NA and the wavelength of the laser beam emitted from the laser beam source is λ, the focal depth d of the beam spot focused by the condensing lens is expressed by $d=\pm\lambda/2NA_2$. Given λ=680 nm and NA=0.45, for example, d=±1.68 µm is resulted. This value is much smaller than the plane runout of ±500 µm that occurs during the rotation of the disk-shaped medium.

For that reason, a focus servo means utilizing the astigmatism process, the Foucault process or the critical angle process, for example, is indispensable in the initializing apparatus for the optical recording medium to be initialized, for the purpose of controlling the beam spot focused through the condensing lens to be always held within the focal depth with respect to the recording layer 9 of the initialized optical recording medium.

However, the initializing apparatus including the focus serve means has two problems as follows.

The first problem is concerned with the condensing lens.

The transparent base plate 7 or the transparent cover layer 13 has a different thickness depending on the type of the optical recording medium to be initialized. To form a normal beam spot without suffering the effect of spherical aberration, therefore, the initializing apparatus must include a dedicated condensing lens in match with the particular thickness of the transparent base plate 7 or the transparent cover layer 13. In other words, it is difficult to initialize various types of optical recording mediums by the initializing apparatus provided with one type of condensing lens.

The second problem is concerned with the focus servo means.

Figure 12:
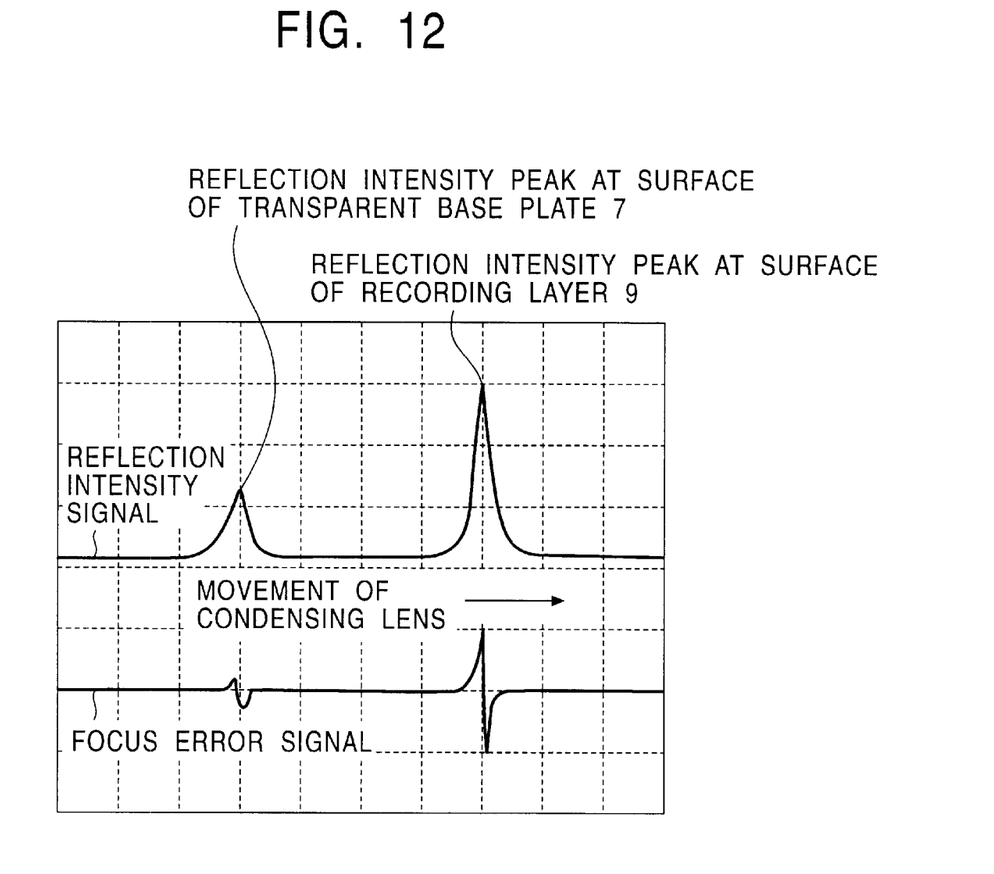
FIG. 12 shows waveforms of a reflection intensity signal and a focus error signal with a conventional optical recording medium to be initialized in which the thickness of a transparent base plate is 0.6 mm and the reflectivity of a recording layer is large.
Figure 13:
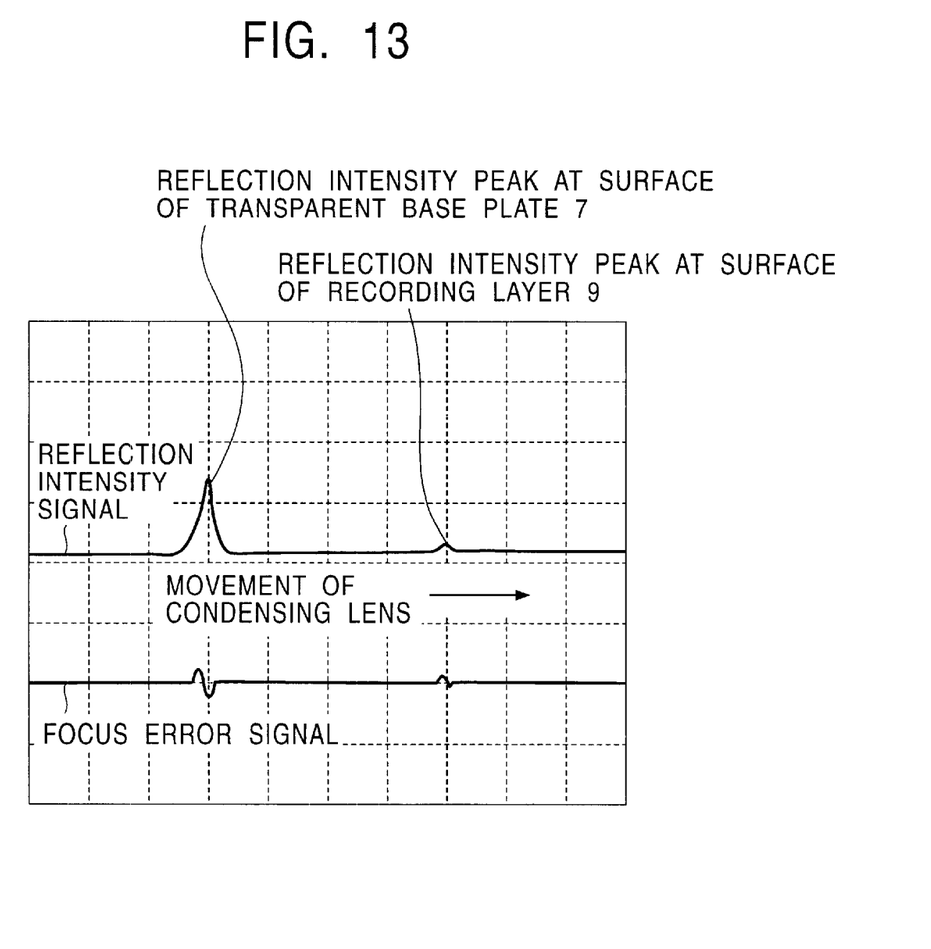
FIG. 13 shows waveforms of a reflection intensity signal and a focus error signal with a conventional optical recording medium to be initialized in which the thickness of a transparent base plate is 0.6 mm and the reflectivity of a recording layer is small.
Figure 14:
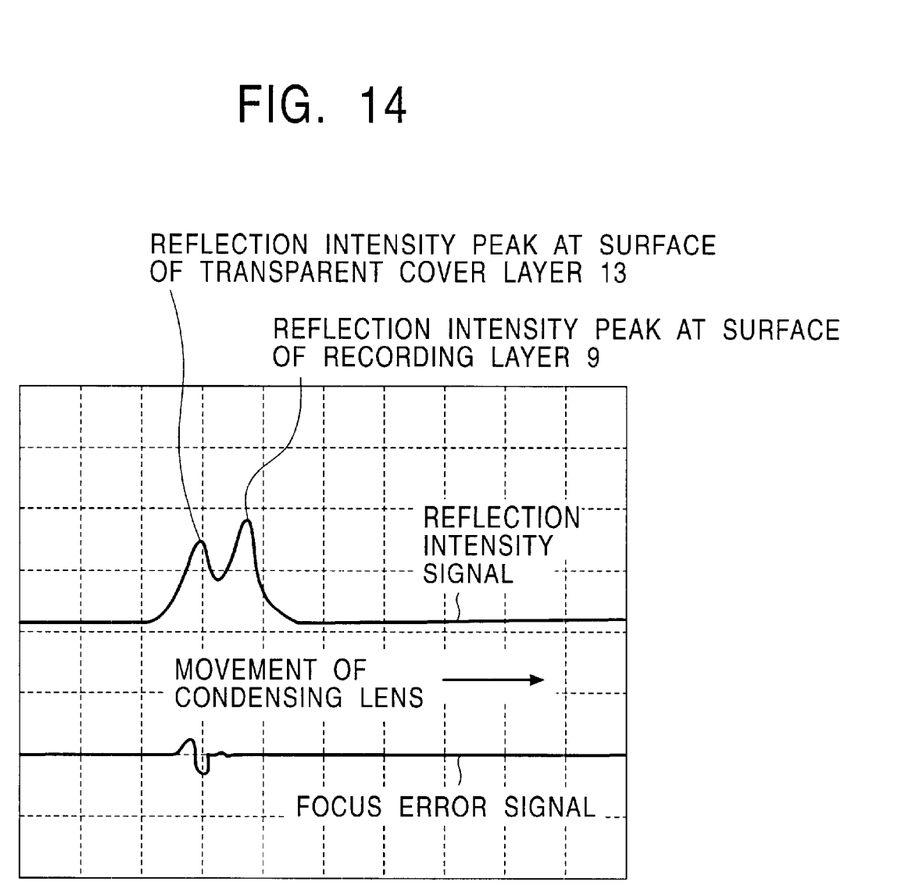
FIG. 14 shows waveforms of a reflection intensity signal and a focus error signal with a conventional optical recording medium to be initialized in which the thickness of a transparent cover layer is 0.1 mm and the reflectivity of a recording layer is large.
Figure 15:
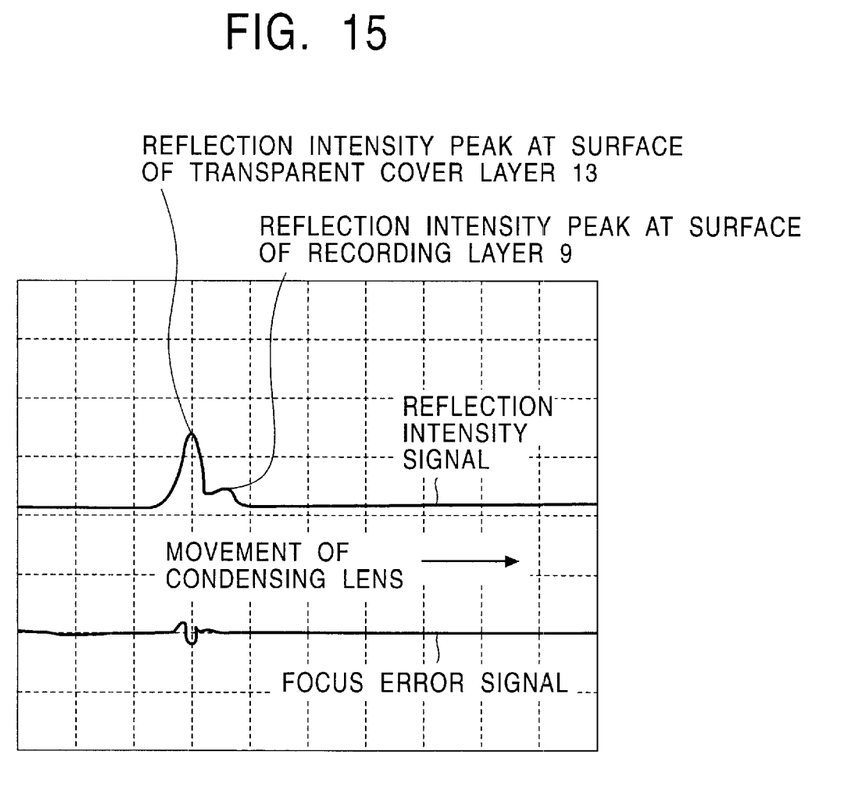
FIG. 15 shows waveforms of a reflection intensity signal and a focus error signal with a conventional optical recording medium to be initialized in which the thickness of a transparent cover layer is 0.1 mm and the reflectivity of a recording layer is small.

Before coming into the focus servo process, a focus search is carried out in which the condensing lens is moved in the focusing direction and the focus of the condensing lens is locked on to the recording layer 9 of the optical recording medium to be initialized. In the focus search, the surface of the recording layer 9 is generally determined by detecting a peak of the reflection intensity. More specifically, the optical recording medium to be initialized, which has a plurality of films formed thereon one above another, shows peaks of the reflection intensity at two points; i.e., the layered film portion and the surface of the transparent base plate 7 or the transparent cover layer 13. FIGS. 12 and 13 show waveforms of a reflection intensity signal and a focus error signal with the initialized optical recording medium of the type shown in FIG. 7 on condition that the thickness of the transparent base plate 7 is 0.6 mm; FIG. 12 shows the case in which the reflectivity of the recording layer 9 is large and FIG. 13 shows the case in which the reflectivity of the recording layer 9 is small. Also, FIGS. 14 and 15 show waveforms of a reflection intensity signal and a focus error signal with the initialized optical recording medium of the type shown in FIG. 8 on condition that the thickness of the transparent cover layer 13 is 0.1 mm; FIG. 14 shows the case in which the reflectivity of the transparent cover layer 13 is large and FIG. 14 shows the case in which the reflectivity of the transparent cover layer 13 is small.

As is apparent from FIGS. 12 to 15, peaks of the reflection intensity are observed at the respective surfaces of the recording layer 9 and the transparent base plate 7 or the transparent cover layer 13. It is therefore required to separate the peaks and lock the focus of the condensing lens on the surface of the recording layer 9. As shown in FIGS. 14 and 15, however, a reduction in thickness of the transparent cover layer 13 increases difficulties in separating the peaks and hence in locking the focus of the condensing lens on the surface of the recording layer 9. Particularly, as shown in FIGS. 14 and 15, when the reflectivity of the recording layer 9 is smaller than that of the transparent base plate 7 or the transparent cover layer 13, the peak of the intensity of reflection from the recording layer 9 is buried in the peak of the intensity of reflection from the transparent base plate 7 or the transparent cover layer 13. This further increases difficulties in locking the focus of the condensing lens on the surface of the recording layer 9.

SUMMARY OF THE INVENTION

An object of the present invention is to provide an apparatus for initializing an optical recording medium to be initialized with stability and ease without employing any focus servo means, and a phase-changing optical recording medium initialized by the initializing apparatus to have a recording layer in a uniform crystalline state over an entire area of the medium which takes part in recording and reproduction of an information signal.

To achieve the above object, according to a first aspect of the present invention, in an apparatus for initializing a phase-changing optical recording medium wherein a laser beam emitted from a laser beam source is irradiated to a recording layer, in an amorphous state, formed in an optical recording medium to be initialized, which is a pre-stage member of the phase-changing optical recording medium, for changing the recording layer from the amorphous state into a crystalline state, the laser beam source, e.g., a YAG laser, includes a high-speed shutter for exciting the laser beam source while the laser beam source is held in a state of not starting oscillation, and emits the laser beam within a very short time on the order of several tens nanoseconds (ns) to several hundreds nanoseconds (ns) with its peak power increased more than 10000 times that produced in a continuous oscillation mode.

According to a second aspect of the present invention, in an apparatus for initializing a phase-changing optical recording medium wherein a laser beam emitted from a laser beam source is irradiated to a recording layer, in an amorphous state, formed in an optical recording medium to be initialized, which is a pre-stage member of the phase-changing optical recording medium, with an optical axis of the laser beam set obliquely relative to the recording layer, for changing the recording layer from the amorphous state into a crystalline state, the laser beam source, e.g., a YAG laser, includes a high-speed shutter for exciting the laser beam source while the laser beam source is held in a state of not starting oscillation, and emits the laser beam within a very short time on the order of several tens nanoseconds (ns) to several hundreds nanoseconds (ns) with its peak power increased more than 10000 times that produced in a continuous oscillation mode.

Also, the present invention provides a phase-changing optical recording medium produced using the apparatus for initializing a phase-changing optical recording medium according to the above first or second aspect.

In the apparatus for initializing a phase-changing optical recording medium according to each of the first and second aspects of the present invention, the laser beam source incident upon the recording layer in an amorphous state is preferably a substantially parallel beam. However, the incident laser beam may be a gently converging or diverging beam that has an energy density enough to change the recording layer from the amorphous state into the crystalline state.

With the above features, the present invention operates as follows.

By employing the laser beam source, including the high-speed shutter, in the apparatus for initializing a phase-changing optical recording medium according to the first aspect of the present invention, the peak power more than 10000 times that produced conventionally can be concentrated in a short time (but enough to raise the temperature of the recording layer for changing from the amorphous state into the crystalline state). As a result, any focus servo means for increasing the power density per unit is no longer required, and the initializing apparatus of the present invention is adaptable for initialization of all types of phase-changing optical recording mediums being different in thickness of a transparent base plate or a transparent cover layer.

Also, by employing the laser beam source, including the high-speed shutter, in the apparatus for initializing a phase-changing optical recording medium according to the second aspect of the present invention, the peak power more than 10000 times that produced conventionally can be concentrated in a short time (but enough to raise the temperature of the recording layer for changing from the amorphous state into the crystalline state). Further, when the laser beam emitted from the laser beam source is irradiated to the recording layer, in an amorphous state, formed in the optical recording medium to be initialized with the optical axis of the laser beam set obliquely relative to the recording layer, the effect of multiple interference occurred between a transparent base plate or a transparent cover layer and the recording layer can be suppressed. As a result, the recording layer having small variations in reflectivity in the crystalline state can be obtained.

DESCRIPTION OF THE PREFERRED EMBODIMENTS

Preferred embodiments of an apparatus for initializing a phase-changing optical recording material, to which the present invention is applied, will be described below with reference to FIGS. 1 to 6, along with FIGS. 7 and 8 having been referred to in connection with the related art.

First Embodiment

In this embodiment, a YAG laser having a high-speed shutter incorporated therein is employed as a laser beam source, and a laser beam emitted from the YAG laser is irradiated substantially perpendicularly to an optical recording medium to be initialized. This embodiment will be described with reference to FIGS. 1 and 4 which show the schematic construction of the initializing apparatus.

Figure 1:
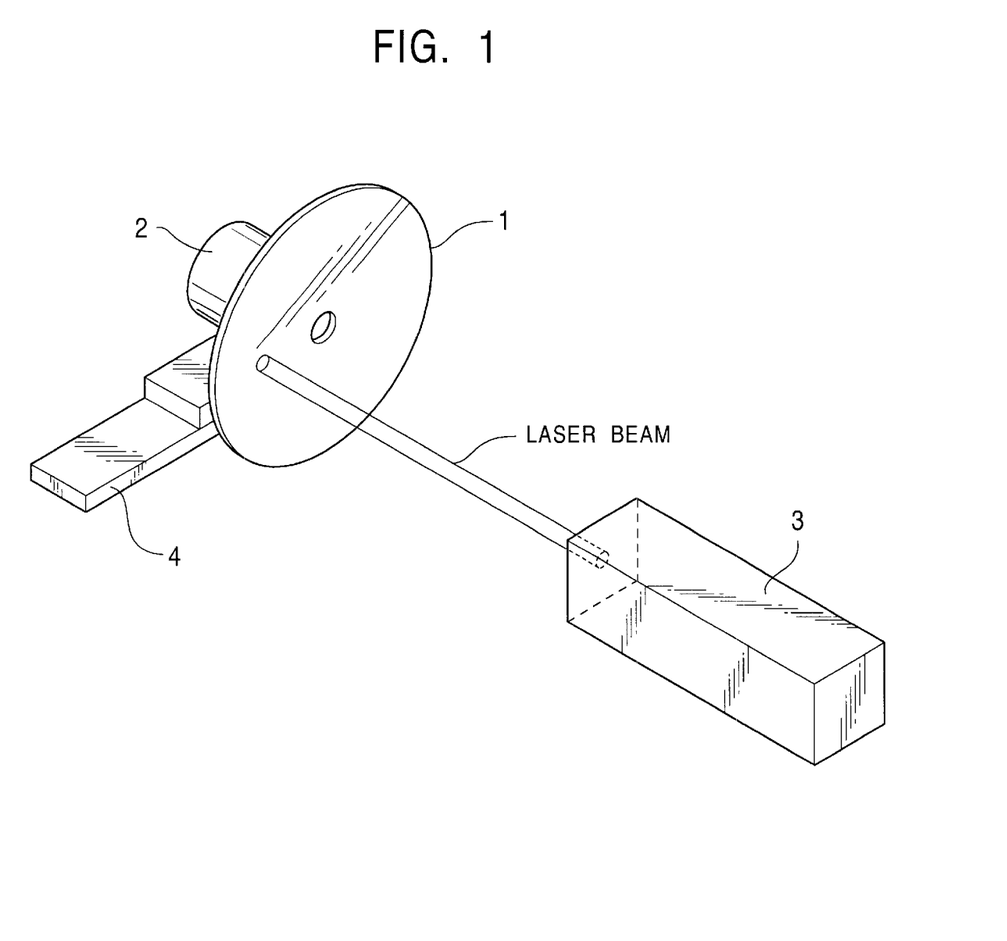
FIG. 1 is a schematic perspective view of an initializing apparatus according to First Embodiment of the present invention.

The initializing apparatus shown in FIG. 1 will be first described.

An optical recording medium 1 to be initialized is mounted on a spindle motor 2. A laser beam emitted from a YAG laser 3 enters substantially perpendicularly to the principal surface of the initialized optical recording medium 1. Also, one of the spindle motor 2 or the YAG laser 3 is provided with a sliding mechanism for scanning the laser beam over the entire surface of a recording layer 9 formed in the initialized optical recording medium 1. In the embodiment of FIG. 1, the sliding mechanism is provided on the side of the spindle motor 2.

Conventionally, 2 mW/$\mu$m$^2$ of energy per unit area has been required to crystallize the recording layer 9 in an amorphous state by using a condensing lens. To obtain such a level of energy, $1000 \times 1000 \times \pi(\mu m^2) \times 2(mW/\mu m^2) \approx 6.3$ kW is required, for example, in the case of employing a beam of a 2-mm diameter without condensing it which is determined from a half-value width of the peak intensity. Since the YAG laser 3 in this embodiment includes the high-speed shutter, oscillation can be quickly brought about by opening the high-speed shutter after the inversed population density has been increased sufficiently by exciting the laser beam source while it is held in a state of not starting the oscillation. With this arrangement, a laser beam is emitted within a very short time on the order of several tens nanoseconds (ns) to several hundreds nanoseconds (ns), and the peak power is increased more than 10000 times that produced in a continuous oscillation mode. Such an oscillation process is generally called Q-switch oscillation or giant pulse oscillation (referred to representatively as Q-switch oscillation hereinafter).

Figure 2:
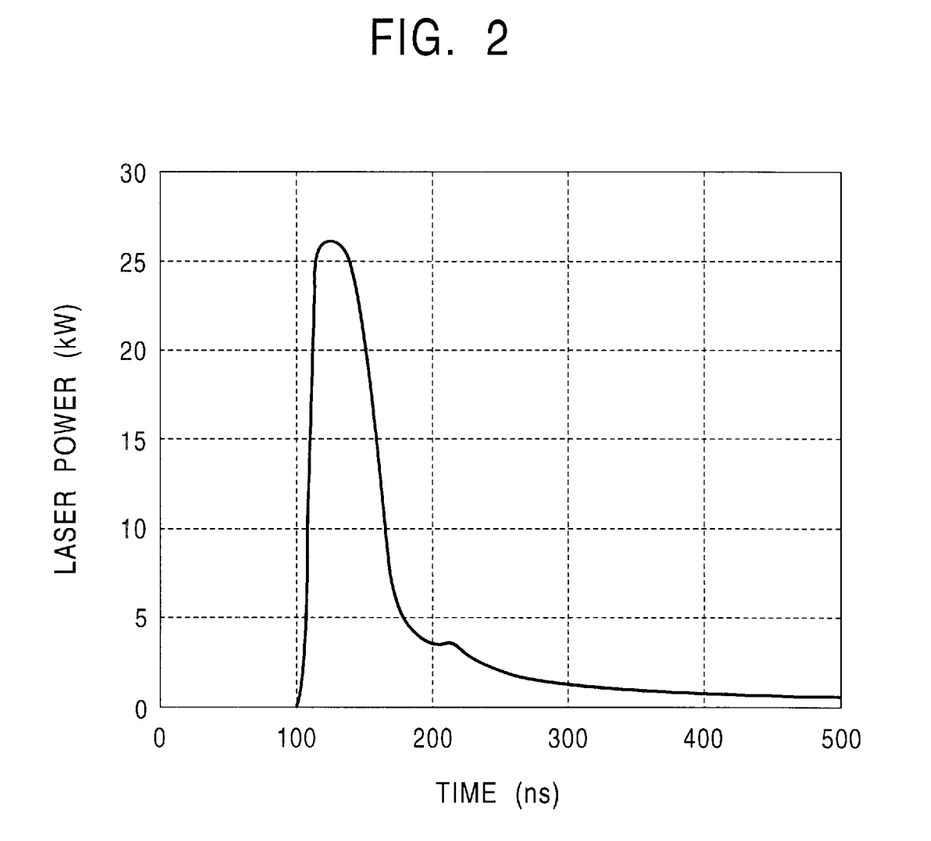
FIG. 2 is a chart showing a power waveform of a laser beam emitted from a YAG laser with Q-switch oscillation in First Embodiment of the present invention.

FIG. 2 shows a power waveform of the laser beam emitted from the YAG laser 3 with the Q-switch oscillation.

As is apparent from FIG. 2, the peak power has energy sufficient to crystallize the recording layer 9, in an amorphous state, of the optical recording medium 1 to be initialized, and a pulse width having a duration sufficient to increase the temperature of the recording layer 9 for crystallization. It is thus understood that the optical recording medium 1 to be initialized can be initialized by irradiating a parallel laser beam to the medium 1.

The above point was actually confirmed by fabricating two types of disk-shaped optical recording mediums 1 to be initialized. The two types of disk-shaped optical recording mediums 1 to be initialized were similar to those shown in FIGS. 7 and 8 having been referred to in connection with the related art.

Steps of fabricating the initialized optical recording medium 1 corresponding to that shown in FIG. 7 will be first described.

First, a first dielectric layer 8 made of a ZnS/SiO$_2$ mixture with a thickness of 110 nm was formed on a transparent base plate 7 with a thickness of 0.6 mm.

Then, a recording layer 9 made of Ge$_{21}$Sb$_{25}$Te$_{54}$ with a thickness of 24 nm was formed on the first dielectric layer 8.

Then, a second dielectric layer 10 made of a ZnS/SiO$_2$ mixture with a thickness of 18 nm was formed on the recording layer 9.

Then, a reflecting layer 11 made of an Al alloy with a thickness of 150 nm was formed on the second dielectric layer 10.

Then, a protective film 12 made of a ultraviolet hardened resin with a thickness of 6 $\mu$m was formed on the reflecting layer 11, thus completing the fabrication of one type of the initialized optical recording medium 1.

Steps of fabricating the initialized optical recording medium 1 corresponding to that shown in FIG. 8 will be next described.

First, a reflecting layer 11 made of an Al alloy with a thickness of 150 nm was formed on a transparent base plate 7 with a thickness of 1.2 mm.

Then, a second dielectric layer 10 made of a ZnS/SiO$_2$ mixture with a thickness of 18 nm was formed on the reflecting layer 11.

Then, a recording layer 9 made of Ge$_{21}$Sb$_{25}$Te$_{54}$ with a thickness of 24 nm was formed on the second dielectric layer 10.

Then, a first dielectric layer 8 made of a ZnS/SiO$_2$ mixture with a thickness of 110 nm was formed on the recording layer 9.

Then, a transparent cover layer 13 made of a ultraviolet hardened resin with a thickness of 100 $\mu$m was formed on the first dielectric layer 8, thus completing the fabrication of the other type of the initialized optical recording medium 1.

The two types of disk-shaped optical recording mediums 1 to be initialized were actually initialized with the initializing apparatus shown in FIG. 1.

Figure 3:
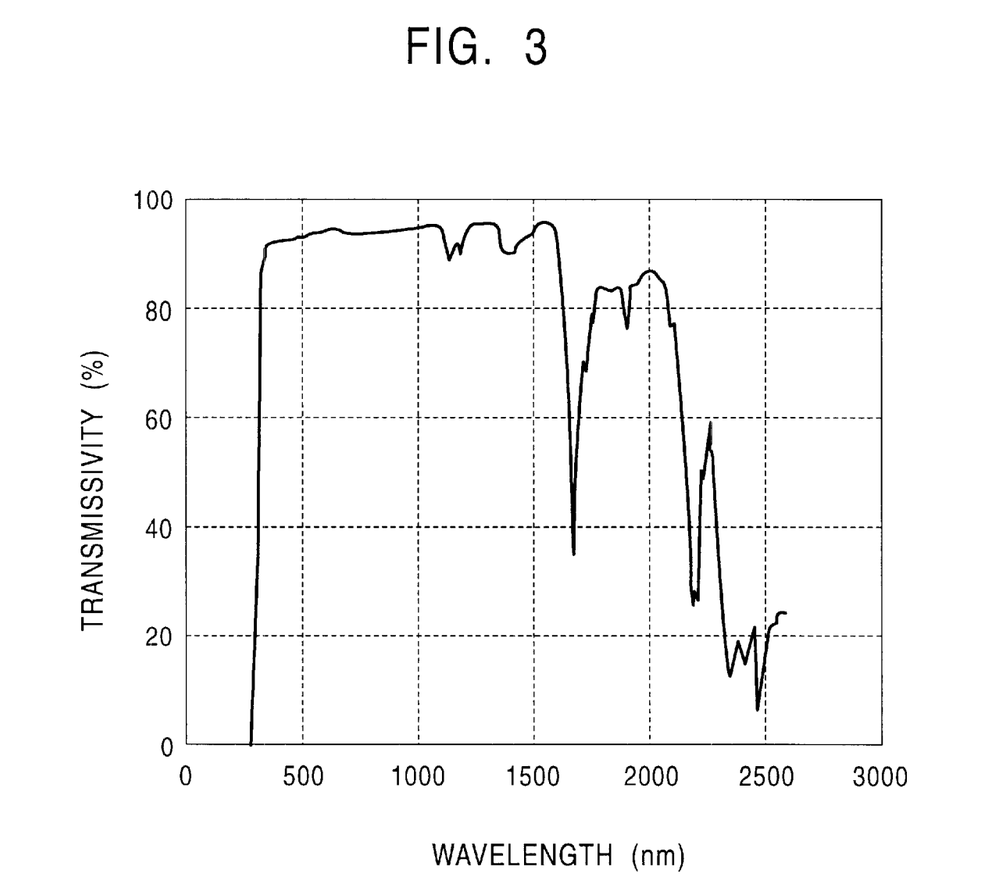
FIG. 3 is a chart showing a wavelength dispersion characteristic of a transparent base plate and a transparent cover layer in First Embodiment of the present invention.

In spite of that the plane runout of approximately ±500 $\mu$m occurred during the rotation of each of the two types of disk-shaped optical recording mediums 1, the reflectivity of the crystallized recording layer 9 of both the mediums was comparable to that obtained with the conventional initializing apparatus which employs the condensing lens and the focus servo means. Variations in reflectivity of the crystal after the initialization were at a level producing no adverse effects on recording and production of an information signal. Further, the inventors studied thermal damages of the transparent base plate 7 or the transparent cover layer 13, which is generally made of a polycarbonate resin, with the incident laser beam. As shown in FIG. 3 plotting a wavelength dispersion characteristic of a polycarbonate resin, the polycarbonate resin has high transmissivity in the wavelength range of 400 nm to 1500 nm. As a result of actually irradiating the laser beam used in the present invention, no thermal damages were found in the transparent base plate 7 or the transparent cover layer 13. Consequently, the focusing lens and the focus servo means for controlling the focusing lens in the focusing direction, which are provided in the conventional initializing apparatus, are no longer required in the initializing apparatus of this embodiment. In addition, a dedicated condensing lens in match with the thickness of the transparent base plate 7 or the transparent cover layer 13 is also no longer required.

In the above embodiment, a substantially parallel laser beam is irradiated to the initialized optical recording medium 1. However, a lens may be disposed in the optical axis between the YAG laser 3 and the initialized optical recording medium 1 so that a gently converging or diverging beam, which has a energy density sufficient to change the recording layer 9 from an amorphous state into a crystalline state, is irradiated to the initialized optical recording medium 1. This case also requires no focus servo means.

The initializing apparatus shown in FIG. 4 will now be described.

Figure 4:
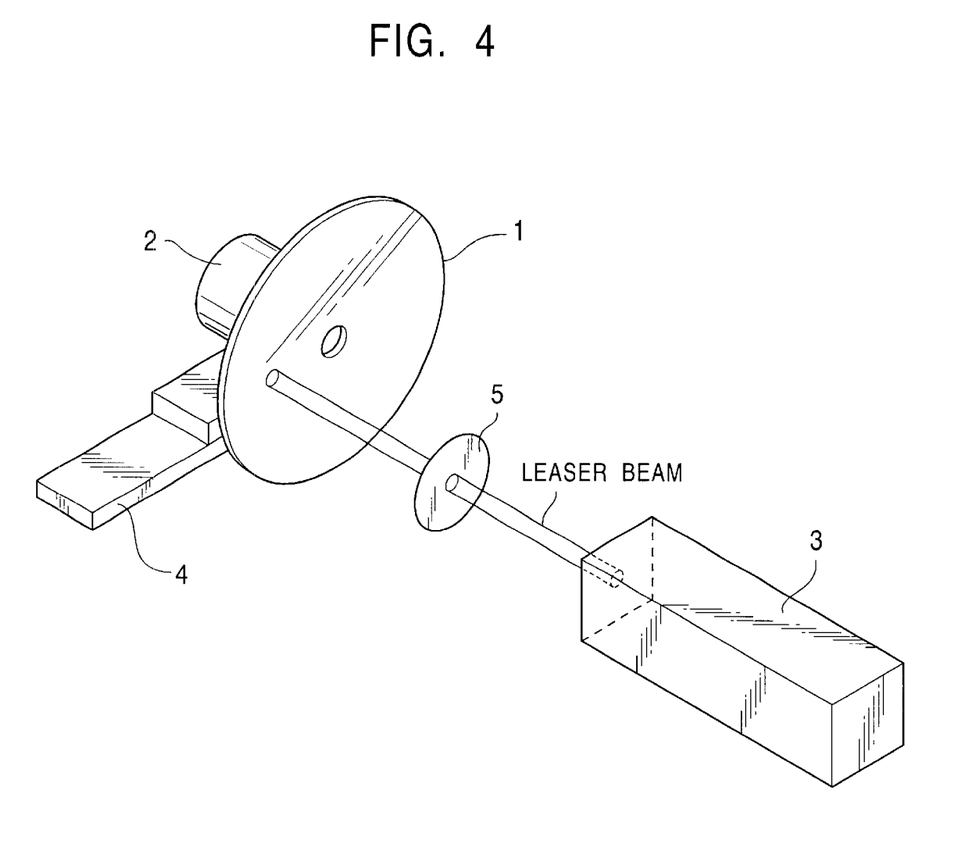
FIG. 4 is a schematic perspective view of a modification of the initializing apparatus according to First Embodiment of the present invention.

The initializing apparatus shown in FIG. 4 differs from that shown in FIG. 1 in that a diffusing plate 5 is disposed in an optical path between the YAG laser 3 and the initialized optical recording medium 1. The provision of the diffusing plate 5 reduces coherence of the laser beam incident upon the initialized optical recording medium 1. In other words, it is possible to suppress multiple interference of light occurred between the transparent base plate 7 or the transparent cover layer 13 and the recording layer 9, and to reduce the effect upon variations in intensity of the laser beam. As a result of initializing the above two types of disk-shaped optical recording mediums 1 to be initialized with the initializing apparatus shown in FIG. 4, uniform reflectivity was obtained over the entire surface of the initialized optical recording mediums 1. In other words, it was confirmed that the recording layer 9, in an amorphous state, of the initialized optical recording medium 1 can be entirely change into a uniform crystalline state with the initializing apparatus shown in FIG. 4. A phase-changing optical recording medium completed by initializing the initialized optical recording medium 1 in such a manner satisfies the conditions necessary for recording and reproduction of an information signal. It is desired to rotate the diffusing plate 5. With the rotation of the diffusing plate 5 disposed in the optical path, a diffusion characteristic of the laser beam diffused through the diffusing plate 5 can be further averaged, and the crystalline state can be made more uniform.

Though not shown, the initializing apparatus shown in FIG. 4 may also include a lens, which serves to irradiate a gently converging or diverging beam to the recording layer 9 in cooperation with the diffusing plate 5, in the optical axis between the YAG laser 3 and the initialized optical recording medium 1. This case also requires no focus servo means.

Second Embodiment

In this embodiment, a YAG laser having a high-speed shutter incorporated therein is employed as a laser beam source, and a laser beam emitted from the YAG laser is irradiated obliquely to the plane in which a recording layer of an optical recording medium to be initialized is formed. This embodiment will be described with reference to FIG. 5 which shows the schematic construction of the initializing apparatus.

Figure 5:
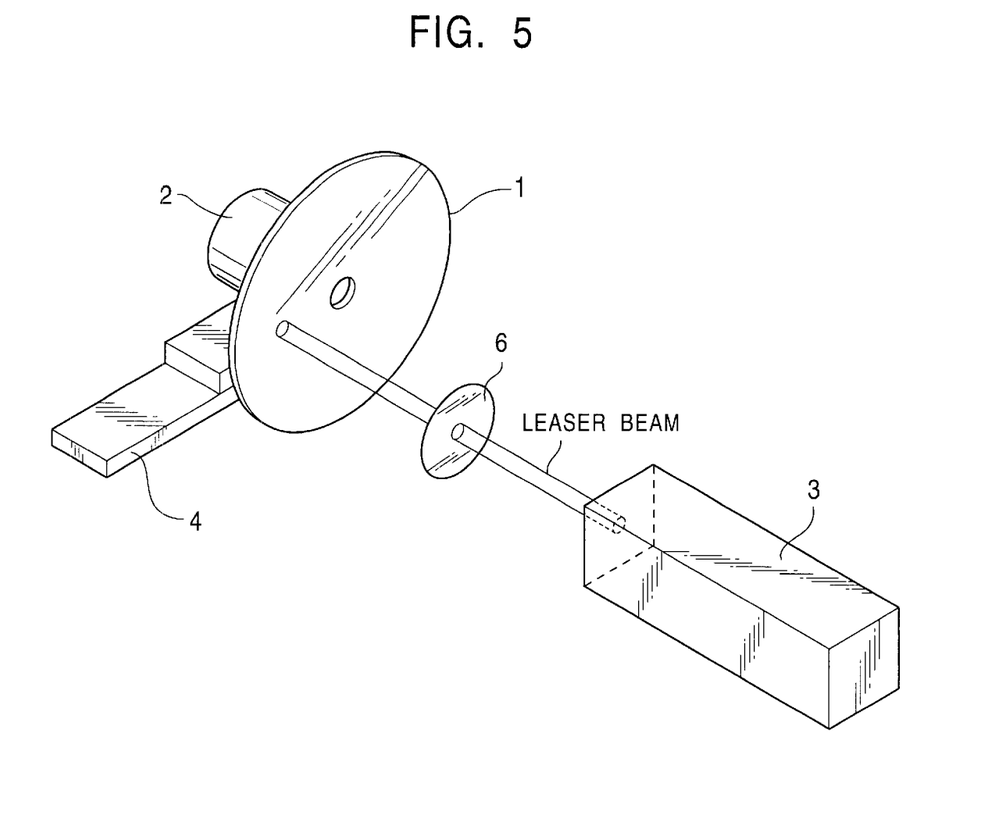
FIG. 5 is a schematic perspective view of an initializing apparatus according to Second Embodiment of the present invention.

An optical recording medium 1 to be initialized is mounted on a spindle motor 2. A laser beam emitted from a YAG laser 3 enters obliquely to the plane in which a recording layer 9, in an amorphous state, of the initialized optical recording medium 1 is formed. Also, one of the spindle motor 2 or the YAG laser 3 is provided with a sliding mechanism for scanning the laser beam over the entire surface of the recording layer 9 formed in the initialized optical recording medium 1. Further, a lens 6 is disposed in the optical axis between the YAG laser 3 and the initialized optical recording medium 1 so that a gently converging or diverging beam is irradiated to the recording layer 9 in an amorphous state. In the embodiment of FIG. 5, the sliding mechanism is provided on the side of the spindle motor 2.

Two types of the optical recording mediums 1 to be initialized, similar to those which have been described in connection with First Embodiment with reference to FIGS. 7 and 8, were fabricated and initialized with the initializing apparatus shown in FIG. 5.

Figure 6:
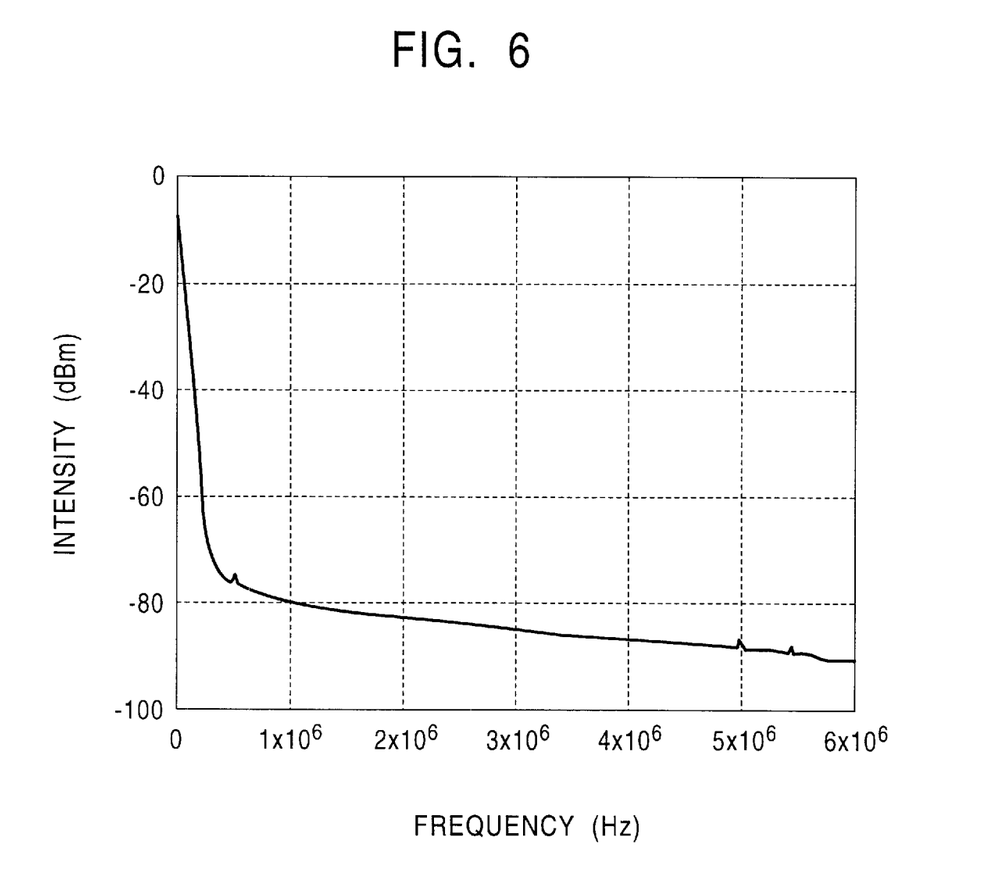
FIG. 6 is chart showing a noise spectrum of the reflectivity of a recording layer according to Second Embodiment of the present invention.

When the laser beam is irradiated obliquely to the plane, in which the recording layer 9 of the initialized optical recording medium 1 is formed, like this embodiment, there occurs multiple interference of light occurred between the transparent base plate 7 or the transparent cover layer 13 and the recording layer 9. As a result of the actual initialization, however, uniform reflectivity was obtained over the entire surface of the initialized optical recording medium 1. FIG. 6 shows a noise spectrum of the reflectivity of the initialized optical recording medium 1 in which the recording layer 9 is changed into the crystalline state. As is apparent from FIG. 6, a noise level is suppressed in a low frequency range as compared with that produced in the condition under the effect of multiple interference. This means that even when the length of the optical path changes due to variations in thickness of the transparent base plate 7 or the transparent cover layer 13, a uniform crystalline state is obtained over the entire surface of the recording surface 9 because the recording surface 9 develops its interference condition in the form of interference fringes with small pitches. Generally, an information signal is recorded on and reproduced from a phase-changing optical recording medium by utilizing reversible phase changes of the recording layer 9 between an amorphous state and a crystalline state due to heat produced upon irradiation of a laser beam. Also, the reflectivity is desirably uniform in the crystalline state and the amorphous state. It was confirmed that the entire surface of the recording layer 9, in the amorphous state, of the initialized optical recording medium 1 can be change into the uniform crystalline state with the initializing apparatus shown in FIG. 5.

In this embodiment, a diffusing plate 5 for reducing coherence of the laser beam may be disposed along with the lens 6 in the optical path between the YAG laser 3 and the initialized optical recording medium 1. This case also requires no focus servo means.

By employing, as a means for changing an amorphous state to a crystalline state, a laser beam source with Q-switch oscillation like the apparatus for initializing a phase-changing optical recording medium according to the present invention, the peak power more than 10000 times that produced conventionally can be obtained. As a result, a substantially parallel beam, or a beam gently converging, or a beam gently diverging can be obtained which has an energy density per unit area comparable to that of a spot of the laser beam converged by a condensing lens toward the focus in the related art. With the use of such a beam, it is possible to make very small variations in energy density which occur in the recording layer when the beam spot is shifted on the optical axis due to a plane runout of the initialized optical recording medium, and to eliminate the need of using the focus servo means which has been essential in the conventional initializing apparatus. Accordingly, an initializing apparatus can be provided which is adaptable for optical recording mediums to be initialized that are pre-stage members of all types of phase-changing optical recording mediums being different in thickness of the transparent base plate or the transparent cover layer, and which can initialize the optical recording medium to be initialized with stability and ease. By using the apparatus for initializing the optical recording medium to be initialized, a phase-changing optical recording medium can be provided which has a recording layer in a uniform crystalline state over an entire area of the medium which takes part in recording and reproduction of an information signal.

What is claimed is:

1. An apparatus for initializing a phase-changing optical recording medium wherein a laser beam emitted from a laser beam source is irradiated to a recording layer, in an amorphous state, of an optical recording medium to be initialized, which is a pre-stage member of said phase-changing optical recording medium, for changing said recording layer into a crystalline state, said laser beam source including a high-speed shutter for exciting said laser beam source while said laser beam source is held in a state of not starting oscillation.

2. An apparatus for initializing a phase-changing optical recording medium according to claim 1, wherein said laser beam source is a YAG laser.

3. An apparatus for initializing a phase-changing optical recording medium according to claim 1, wherein a diffusing plate is disposed between said laser beam source and said optical recording medium to be initialized.

4. An apparatus for initializing a phase-changing optical recording medium according to claim 1, wherein said laser beam is a substantially parallel beam.

5. An apparatus for initializing a phase-changing optical recording medium according to claim 1, wherein said laser beam has a wavelength in the range of 400 nm to 1500 nm.

6. An apparatus for initializing a phase-changing optical recording medium wherein a laser beam emitted from a laser beam source is irradiated to a recording layer, in an amorphous state, of an optical recording medium to be initialized, which is a pre-stage member of said phase-changing optical recording medium, with an optical axis of said laser beam set obliquely relative to said recording layer, for changing said recording layer into a crystalline state, said laser beam source including a high-speed shutter for exciting said laser beam source while said laser beam source is held in a state of not starting oscillation.

7. An apparatus for initializing a phase-changing optical recording medium according to claim 6, wherein said laser beam source is a YAG laser.

8. An apparatus for initializing a phase-changing optical recording medium according to claim 6, wherein a diffusing plate is disposed between said laser beam source and said optical recording medium to be initialized.

9. An apparatus for initializing a phase-changing optical recording medium according to claim 6, wherein said laser beam is a substantially parallel beam.

10. An apparatus for initializing a phase-changing optical recording medium according to claim 6, wherein said laser beam has a wavelength in the range of 400 nm to 1500 nm.

11. A phase-changing optical recording medium produced using said apparatus for initializing a phase-changing optical recording medium according to claim 1.

12. A phase-changing optical recording medium produced using said apparatus for initializing a phase-changing optical recording medium according to claim 6.

* * * * *

UNITED STATES PATENT AND TRADEMARK OFFICE
CERTIFICATE OF CORRECTION

PATENT NO.    : 6,418,103 B1
DATED         : July 9, 2002
INVENTOR(S)   : Kazumine Ito et al.

It is certified that error appears in the above-identified patent and that said Letters Patent is hereby corrected as shown below:

Drawings,
Figures 4, 5, 7 and 8, change "LEASER" to -- LASER --.

Column 7,
Line 16, delete "a" (second occurrence);
Line 35, delete "a" (second occurrence); and
Line 44, change "1, the" to -- 1. The --.

Column 9,
Line 6, delete the comma;
Line 9, delete "occurred"; and
Line 34, change "change" to -- changed --.

Signed and Sealed this

Fourth Day of February, 2003

JAMES E. ROGAN
*Director of the United States Patent and Trademark Office*